(No Model.)
T. E. WILLIAMS.
TEA OR COFFEE POT.
No. 476,851. Patented June 14, 1892.
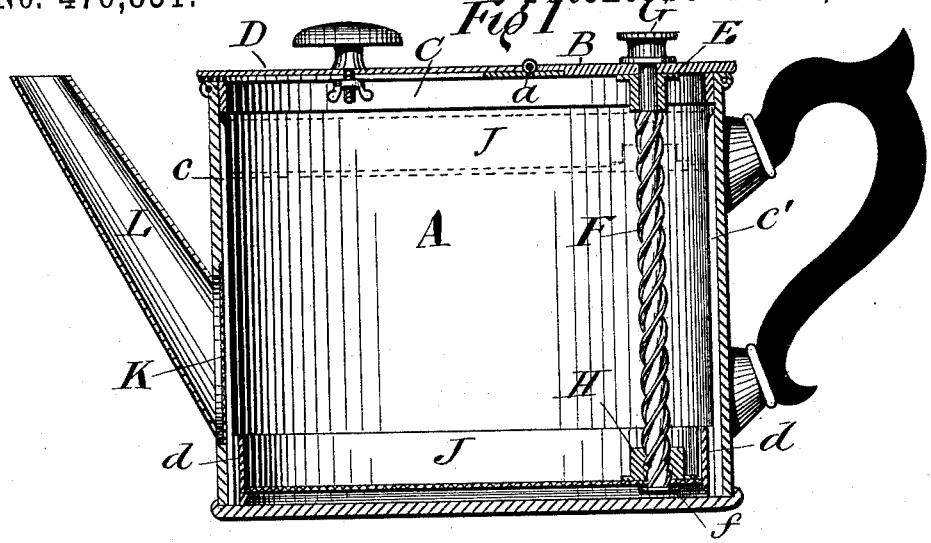
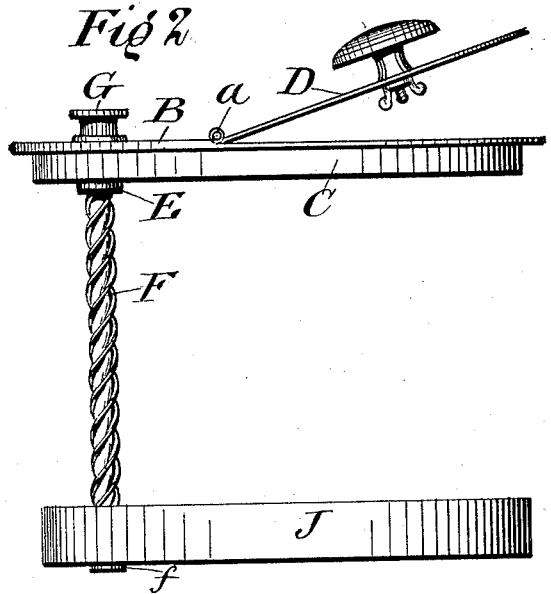
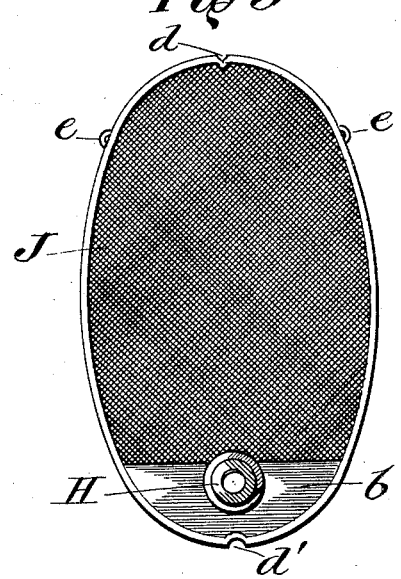
Witnesses
Inventor
Thomas Edward Williams
By Attorneys ated June 14, 1892.

UNITED STATES PATENT OFFICE.

THOMAS EDWARD WILLIAMS, OF LONDON, ENGLAND.

TEA OR COFFEE POT.

SPECIFICATION forming part of Letters Patent No. 476,851, dated June 14, 1892.

Application filed November 18, 1891. Serial No. 412,297. (No model.)

*To all whom it may concern:*

Be it known that I, THOMAS EDWARD WILLIAMS, commercial traveler, a subject of Her Majesty the Queen of Great Britain, residing at 21 King's Road, Brownswood Park, London, England, have invented certain new and useful Improvements in Tea or Coffee Pots and Similar Vessels Employed in the Preparation of Infusions, (for which I intend making application for a patent in Great Britain,) of which the following is a specification.

The salient points of my invention are, first, the manner of constructing the lid or cover of the vessel, so as to be easily removed from the body thereof for the purpose of thoroughly cleansing the vessel, and, secondly, of a perforated tray placed within the vessel capable of being raised or lowered at will for the purpose of lifting the tea-leaves or other substance being infused out of the liquor when the said infusion has reached the strength desired or when a given time has elapsed beyond which certain objectionable or injurious properties that may be contained in the article undergoing infusion would exude therefrom—such, for instance, as the tannic acid in tea—contained in very minute cells or chambers concealed within the herb, which do not burst or discharge their contents until a certain space of time has elapsed from the commencement of the process of infusion; and I attain this by constructing the vessel according to my invention upon the principle illustrated by the accompanying drawings, in which—

Figure 1 is a vertical section of a complete tea-pot constructed according to my invention. Fig. 2 is a view of the lid and tray and connecting-screw as it would appear when removed from Fig. 1. Fig. 3 is a plan view of the perforated tray as it would appear when the lid and screw are removed therefrom.

I wish it understood that the object of my invention is to provide a means for removing the substance or ingredients undergoing infusion from the liquor when the same has reached a certain or given strength or specific gravity and this without removing the cover from the vessel, and also a quick and ready means of thoroughly cleansing said vessel after use, and although I have chosen to illustrate the application of my invention in connection with tea-pots, it is obvious that the same may be adapted for use in connection with other vessels employed for a like purpose, and the employment of the method and means for attaining the ends set forth in the manner hereinafter explained is what I desire to secure by Letters Patent.

In carrying my invention into effect I construct of any suitable material and of any desired shape in plan a tea-pot A, the portable cover B of which is provided with a rim C, arranged to fit either within or without the pot A. The cover B may be solid to any extent of its area, but preferably somewhat less than one-half, the remainder of its area being covered by a lid D of any desired shape or pattern hinged or otherwise connected thereto at $a$.

Within any suitable part of the solid portion of B, I provide an aperture and insert therein a vertical boss E, which may extend within and without B for any desired distance and carries the upper end of a vertical Archimedean screw F, surmounted by a milled nut or the like G, by which it may be rotated. The screw F passes through and engages with an internally-threaded boss H, connected by a suitable stay or stays $b$ to a perforated or wire-gauze tray J, the rim of which may be of any suitable metal or material, the outer conformation thereof corresponding with and its diametrical dimensions slightly less than the interior of A, so that it may be free to travel up and down therein when the screw F is turned in the direction necessary to accomplish this.

In order that J may perform its up-and-down travel, I may provide a guide $c$ within A, engaging with a V or other shaped slot $d$ in J, or, if necessary, I may provide a second guide $c'$ and a second V or other shaped slot $d'$ at the opposite end of J, or I may use the guide $c'$ without the guide $c$, or in lieu of said guides and slots I prefer to provide any number of projections $e$ upon the outer surface of J for a like purpose. When said guide $c$ is employed, the perforated strainer K at the internal orifice of the spout L would be formed in a manner to permit the presence of $c$, which may, if necessary, be attached thereto.

The screw F may be provided with a burr $f$ upon its lower end, if needed, or $f$ may be dispensed with in order that F may be capable of removal from J, if necessary, as in Fig. 3.

The tea or other ingredient to be infused would be placed within J when this is at the bottom of A, as in Fig. 1, and the water or other liquor poured thereon in the usual way and the lid D closed, and when the infusion has reached the desired strength the nut G or its equivalent would be turned by the thumb and finger in the direction necessary, and this imparting a corresponding rotation to the screw F, the tray J would be raised thereby to a distance equal to the extent of the turning of G or until J had reached the position indicated by the dotted outline thereof in Fig. 1, and so place the tea or the like above the level of the liquor and prevent further infusion. The liquor could then be poured out in the usual way while J is suspended, thereby insuring a perfectly-clear infusion, and when needed J may be again lowered by the reversed motion of G and F.

In Fig. 2 the position of the cover, screw, and tray are reversed relatively to that of Fig. 1, by which it will be understood that when the same has been removed for cleaning it may be returned to A, with the lid D opening from the spout or the handle, as desired.

The percolating-surface of J may be of punctured metal, woven wire, or other suitable material, and of any-sized mesh necessary for the tea or other substance being infused. The tray J is perforated for almost its entire surface, a solid portion being provided only at the end where the screw passes through.

Having now fully described my invention, what I claim, and desire to secure by Letters Patent, is—

1. The herein-described coffee or tea pot, consisting of the pot A, portable cover B, provided with rim C, the lid D on said portable cover B, the boss E, tray J, provided with boss H and perforated on only a portion of its surface and provided with projections E, and screw F at one edge of the tray and pot engaging boss H and passing through said tray, said boss H being located at the imperforate portion of the tray, substantially as herein set forth.

2. The herein-described coffee or tea pot, consisting of the elliptical pot A, portable cover B, provided with rim C, the lid D on said portable cover B, the boss E, elliptical tray J, provided with boss H and perforated on only a portion of its surface and provided with projections E, and screw F at one edge of the tray and pot engaging boss H and passing through said tray, said boss H being located at the imperforate portion of the tray, substantially as herein set forth.

In witness whereof I have hereunto set my hand in presence of two witnesses.

THOMAS EDWARD WILLIAMS.

Witnesses:
GEO. THOS. HYDE,
4 *Moorfields, E. C., Patent Agent.*
HERBERT SELLEY,
*Clerk to Messrs. Comerford & Co., 7 Tokenhouse Yard, London, E. C., Public Notaries.*